US012667873B2

(12) United States Patent
Park et al.

(10) Patent No.: US 12,667,873 B2
(45) Date of Patent: Jun. 30, 2026

(54) SURFACE LAYER IMPROVEMENT SYSTEM AND METHODS FOR ON-SITE REMEDIATION OF CONTAMINATED SEDIMENTS

(71) Applicant: IUCF-HYU (INDUSTRY-UNIVERSITY COOPERATION FOUNDATION HANYANG UNIVERSITY), Seoul (KR)

(72) Inventors: Jae-Woo Park, Seoul (KR); Hyun-Kyung Kim, Seoul (KR); Kyoungrean Kim, Busan (KR); Gaeun Lee, Busan (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 63 days.

(21) Appl. No.: 18/806,026

(22) Filed: Aug. 15, 2024

(65) Prior Publication Data
US 2025/0058366 A1     Feb. 20, 2025

(30) Foreign Application Priority Data
Aug. 18, 2023     (KR) ........................ 10-2023-0108033

(51) Int. Cl.
E02F 5/00          (2006.01)
B09C 1/00          (2006.01)
B09C 1/10          (2006.01)

(52) U.S. Cl.
CPC ................ B09C 1/10 (2013.01); E02F 5/006 (2013.01); B09C 2101/00 (2013.01)

(58) Field of Classification Search
CPC .......... E02F 5/006; E02F 3/8841; B09C 1/10; B09C 2101/00
See application file for complete search history.

(56) References Cited

U.S. PATENT DOCUMENTS

2005/0087499 A1*    4/2005   Hayes ................... E02F 3/8841
                                                     210/747.4

FOREIGN PATENT DOCUMENTS

| KR | 101148748 B1 * | 5/2012 | ........... E02F 3/9268 |
| KR | 10-2014-0099967 A | 8/2014 | |
| KR | 10-1980513 B1 | 10/2018 | |
| KR | 10-2291227 B1 | 8/2020 | |
| KR | 10-2160058 B1 | 9/2020 | |
| KR | 10-2020-0120272 A | 10/2020 | |
| WO | WO-9803229 A1 * | 1/1998 | ........... C05F 17/943 |
| WO | WO-2011057952 A1 * | 5/2011 | ............... B09C 1/00 |

* cited by examiner

*Primary Examiner* — Amber R Anderson
*Assistant Examiner* — Stacy N Lawson

(57) ABSTRACT

A surface layer improvement system for on-site remediation of contaminated sediments includes: a stabilizer spray unit that performs underwater spraying of a stabilizer to a remediation target region; and a disturbing and mixing unit that induces bioturbation by mixing the stabilizer with the contaminated sediments in water. The disclosure performs the remediation of the contaminated sediments by spraying the stabilizer to the remediation target region of a water bottom floor through the stabilizer spray unit and performing on-site incorporation of the stabilizer sprayed through the disturbing and mixing unit.

13 Claims, 6 Drawing Sheets

110

130

SURFACE LAYER IMPROVEMENT SYSTEM AND METHODS FOR ON-SITE REMEDIATION OF CONTAMINATED SEDIMENTS

CROSS-REFERENCE TO RELATED APPLICATION

The present application claims priority under 35 U.S.C. § 119 (a) to Korean Patent Application No. 10-2023-0108033 filed in the Korean Intellectual Property Office on Aug. 18, 2023, which is incorporated herein by reference in its entirety.

BACKGROUND OF THE INVENTION

Field of the Invention

The present invention relates to a surface layer improvement system and methods that can be used for on-site remediation of contaminated sediments.

Description of the Related Art

According to the "first fundamental plans for the management of marine wastes and contaminated marine sediments (2021-2030)" of the Ministry of Oceans and Fisheries, Korea (Rep. of), the marine contaminated sediments in need of urgent remediation was surveyed to be at least 11.8 million cubic meters in sea areas managed by the Ministry of Oceans and Fisheries from 2004 to 2022, and it is known that 5.9 million cubic meters are to be remediated through environmental dredging and the like by 2030. However, despite the continuous effort by the Korean government, some land and sea areas in Korea are exposed to various contamination sources such as organic pollutants and hazardous heavy metals and are left unattended.

In the related art, as the remediation of contaminated sediments in Korean water systems, monitored natural recovery (MNR) that optimizes the self-remediation of nature, environmental dredging of dredging and disposing of contaminated sediments from the water bottom floor, and the like have mainly been used, and it is known that an on-site treatment technique using geotextiles is also being introduced recently.

The monitored natural recovery technique is a technique of inducing natural recovery by isolating a target area from an external environment in a state in which contamination sources around a target water system are blocked, but in the case of Korea which has a relatively small land area, it is difficult to isolate a specific area, so the application of the technique is limited. The environmental dredging technique has a problem of treatment of dredged materials including contaminated sediments. In other words, the treatment of the dredged contaminated sediments, effective utilization of products after the treatment, monitoring or follow-up management thereof, and the like are required, and the treatment, the utilization, the management, and the like take a considerable amount of time and costs. Korean Patent Registration No. 10-2291227 discloses "ECO-FRIENDLY DREDGER FOR POLLUTANTS SEDIMENT OF SEA BOTTOM" as a type of environmental dredging. The on-site treatment is a method of inducing physical adsorption of contamination sources by covering a contaminated sediment layer with a broad membrane made of a geotextile, or the like. For example, Korean Patent Registration No. 10-1980513 discloses "COVERING MATERIAL FOR COVERING POL- LUTED SEDIMENTS AND METHOD FOR PREPARING THE SAME" as a type of on-site treatment. However, this on-site treatment technique has limitations in that remediation effects can only be applied to a limited region such as a surface layer and the geotextile is not easy to handle or install.

Against the aforementioned background, discussions about techniques of enabling the contaminated sediments to be effectively treated on site are in progress.

The above description is provided for an easy understanding of the technical background of the invention and is not to be construed as reducing, limiting, or restricting the technical ideas of the invention. In addition, the details described or implied in the above description do not necessarily refer to the related art, and some may contain details that do not correspond to the related art.

SUMMARY OF THE INVENTION

Embodiments of the disclosure are intended to provide a surface layer improvement system and methods that can be used for on-site remediation of contaminated sediments.

In addition, the embodiments of the disclosure are intended to provide a surface layer improvement system and methods capable of effectively incorporating a stabilizer into contaminated sediments for on-site remediation and preventing an effect of a remediation operation from reaching an underwater environment.

However, technical objects that are desired to be achieved by the embodiments of the disclosure are not necessarily limited to the above-mentioned technical objects. Other unmentioned technical objects may be clearly understood by a person with ordinary skills in the technical field to which the disclosure pertains from other descriptions in the specification such as detailed description.

According to one aspect of the disclosure, there may be provided a surface layer improvement system for on-site remediation of contaminated sediments, including: a stabilizer spray unit that performs underwater spraying of a stabilizer to a remediation target region; and a disturbing and mixing unit that induces bioturbation by mixing the stabilizer with the contaminated sediments in water.

According to another aspect of the disclosure, there may be provided a surface layer improvement method for on-site remediation of contaminated sediments, including: a step of spraying a stabilizer to a remediation target region through a stabilizer spray unit; a step of inducing bioturbation by mixing the stabilizer with the contaminated sediments in water through a disturbing and mixing unit; and a step of moving to another remediation target region adjacent to the remediation target region and repeating the spraying and mixing of the stabilizer.

DETAILED DESCRIPTION OF THE PREFERRED EMBODIMENTS

The following embodiments can be provided to a person with ordinary skills in the technical field to which the invention pertains in order to describe the invention more completely. However, the following embodiments are provided for an easy understanding of the invention, and the technical ideas of the invention are not necessarily limited to the specific embodiments to be described below. The invention should be understood to broadly include various types of equivalents, substitutes, modified products, and the like which embody the technical ideas to be described in the following embodiments.

The terms used in the following embodiments are provided to describe the specific embodiments more completely from the above point of view. The terms used in the following embodiments should not be construed to reduce, limit, or restrict the technical ideas of the invention.

In the following description, a singular noun can be construed to include a meaning of its plural noun unless the meaning of the plural noun is clearly excluded in context. The expression "to comprise" in the following description means that a configuration, a component, an operation, a characteristic, a step, a number, or the like described in the description is present, and does not mean that addition of one or more other configurations, components, operations, characteristics, steps, numbers, or the like is excluded.

In the following description, terms such as "first" and "second" may be used to distinguish specific configurational elements from other configurational elements. However, the above-described terms are used for the purpose of designating specific configurational element distinguished from other configurational element for the sake of clarity of description, and the technical ideas of the configurational elements should not be construed as limited by the above terms.

Hereinafter, embodiments of the disclosure will be described with reference to the accompanying drawings. For the sake of convenience, the detailed description which causes the technical gist of the invention to be obscured or the detailed description of a known configuration will be omitted.

Figure 1:
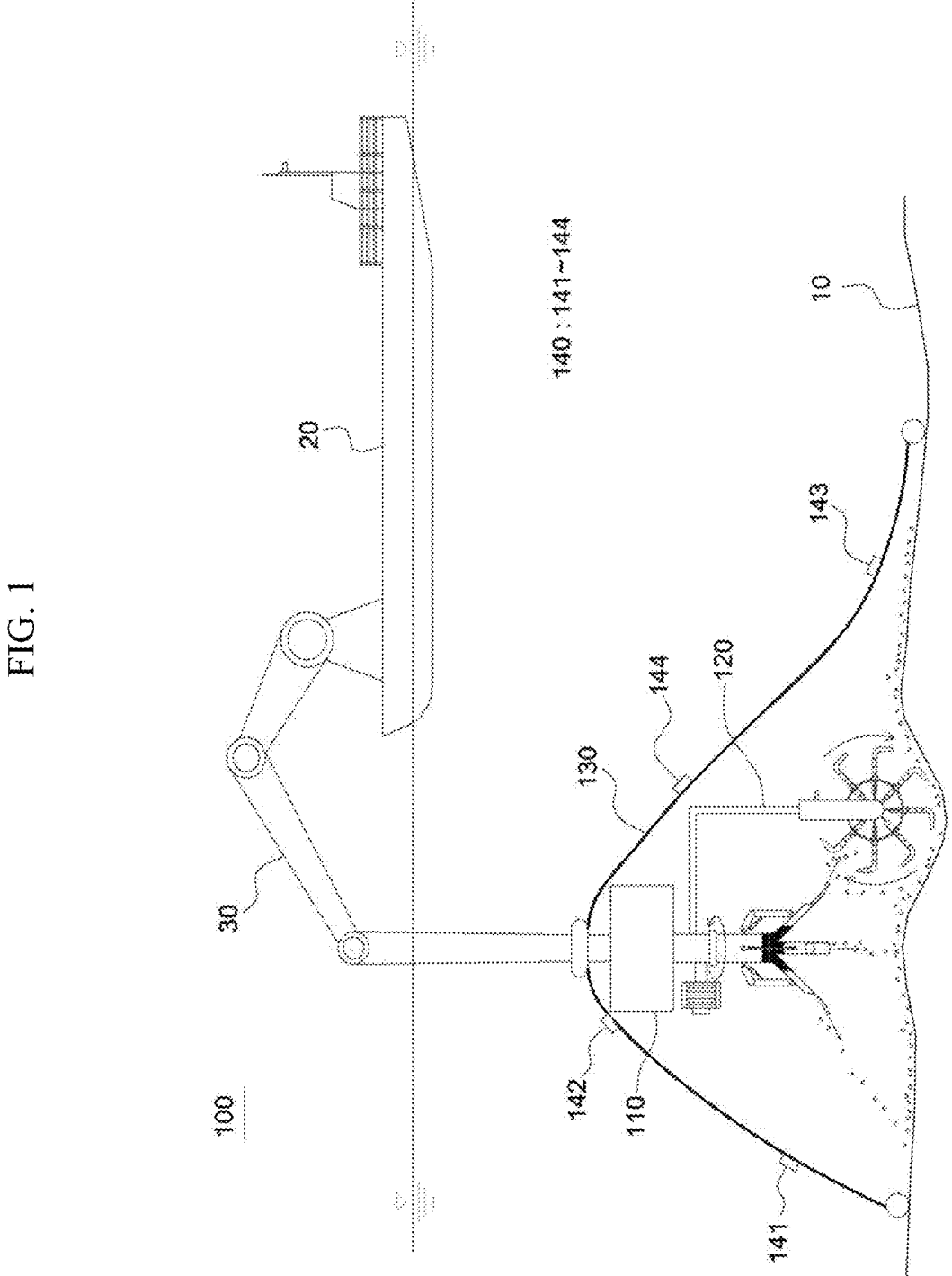
FIG. 1 is a conceptual view of a surface layer improvement system according to an embodiment of the disclosure.

FIG. 1 is a conceptual view of a surface layer improvement system according to an embodiment of the disclosure.

With reference to FIG. 1, a surface layer improvement system 100 according to the embodiment is disposed at a water bottom floor 10 and can be used to perform on-site remediation of contaminated sediments deposited on the water bottom floor 10.

The water bottom floor 10 can include water bottom floors in various water systems such as land and sea areas. In one example, the water bottom floor 10 can include a water bottom floor in a relatively small-scale water system such as an inland river. The surface layer improvement system 100 according to the embodiment can be used as effective remediation means of the water bottom floor in such a small-scale water system. However, the surface layer improvement system is not necessarily limited thereto.

The contaminated sediments can be deposited on the water bottom floor 10. In general, the contaminated sediments can be piled to have a thickness of several to several tens of centimeters below a surface layer of the water bottom floor 10. However, a thickness and a distribution of contaminated sediments can vary depending on environmental conditions of the water bottom floor 10 which is a treatment target. The contaminated sediments can include various types of contamination sources deposited on the water bottom floor 10, such as a harmful heavy metal or a persistent organic pollutant. The surface layer improvement system 100 according to the embodiment can be characterized in that the surface layer improvement system remediates a contamination source including a contaminated sediment layer present in a surface layer and below the surface layer.

The surface layer improvement system 100 according to the embodiment can be configured to perform on-site remediation of the contaminated sediments. In other words, the surface layer improvement system 100 according to the embodiment can be configured to spray and mix a stabilizer directly to the water bottom floor 10 on site to induce a bioturbation effect for a short time and to perform the remediation of the contaminated sediments. The surface layer improvement system 100 according to the embodiment can be distinguished from the monitored natural recovery (MNR) technique in the related art in that the surface layer improvement system performs an active remediation treatment, and can be distinguished from the environmental dredging technique in the related art in that the surface layer improvement system performs the on-site remediation treatment.

In order for the on-site remediation technique as described above to function effectively, the surface layer improvement system 100 according to the embodiment can perform spraying, mixing, and the like of the stabilizer in a state in which the water bottom floor 10 of a remediation target region is isolated from the outside. The remediation target region can be isolated by a barrier structure 130 to be described below.

On the other hand, the surface layer improvement system 100 according to the embodiment can include a stabilizer spray unit 110.

The stabilizer spray unit 110 can be formed to spray the stabilizer to the water bottom floor 10. The stabilizer can include various types and forms of stabilizers that can produce an appropriate remediation effect on the contaminated sediments. In the embodiment, the type, form, and the like of a stabilizer are not particularly limited. However, preferably, a stabilizer having a solid particle form such as a pellet can be used. The pellet-shaped stabilizer has an advantage in that uniform spraying can be performed in the remediation target region due to characteristics of the stabilizer spray unit 110 to be described below.

In the embodiment, the stabilizer spray unit 110 can be disposed in the water. Specifically, the barrier structure 130 can be installed in the remediation target region of the water bottom floor 10, and the stabilizer spray unit 110 can be disposed inside the barrier structure 130. The stabilizer spray unit 110 can be formed to spray the stabilizer from above the water bottom floor 10 toward the water bottom floor 10, and the sprayed stabilizer can be mixed with the contaminated sediments when the stabilizer sinks to the water bottom floor 10.

The stabilizer spray unit 110 can be maintained at a location above the water bottom floor 10 by predetermined installation means. In the case of the embodiment, the stabilizer spray unit 110 is maintained at the location above the water bottom floor 10 by a workboat 20 on the water and a crane 30 equipped in the workboat 20. This case has an advantage in that the remediation target region can be relatively easily changed through the movement of the workboat 20 and the crane 30. However, the disclosure is not necessarily limited thereto, and more various installation means can be used as necessary. For example, a technique of supporting the stabilizer spray unit 110 on a structure fixed on the water bottom floor and the like 10 can be considered.

Meanwhile, the disturbing and mixing unit 120 to be described below can also be maintained at a location above the water bottom floor 10 by predetermined installation means, similarly to the stabilizer spray unit 110.

Figure 2:
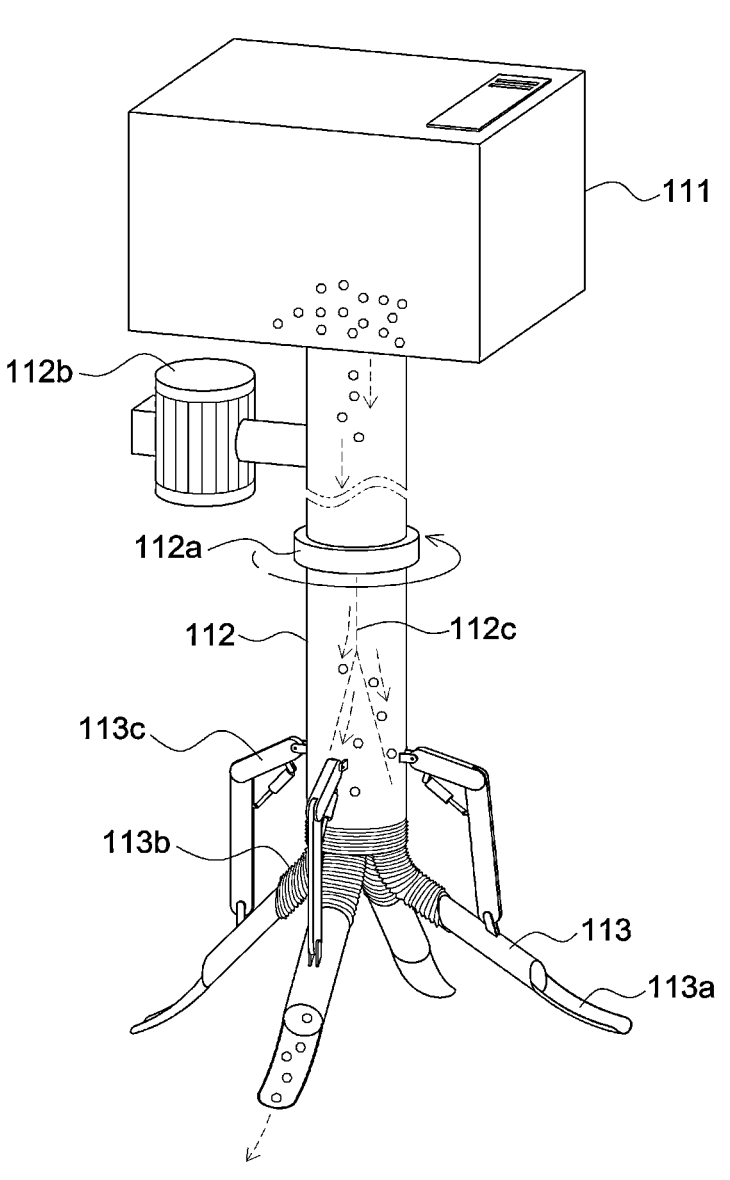
FIG. 2 is a view of details of a stabilizer spray unit illustrated in FIG. 1.

FIG. 2 is a view of details of a stabilizer spray unit illustrated in FIG. 1.

With reference to FIG. 2, the stabilizer spray unit 110 can include a stabilizer storage 111. The stabilizer storage 111 has a predetermined internal space and can store the stabilizer.

Meanwhile, the stabilizer spray unit 110 can include a stabilizer supply pipe 112. The stabilizer supply pipe 112 can be formed to allow the stabilizer provided from the stabilizer storage 111 to be transferred and guided to stabilizer spray pipes 113. In the embodiment, the stabilizer supply pipe 112 is formed to extend downward from the stabilizer storage 111 by a predetermined length. An upper end of the stabilizer supply pipe 112 is connected to the stabilizer storage 111 so that the stabilizer can be supplied to the stabilizer supply pipe, and a lower end of the stabilizer supply pipe 112 can be equipped with the stabilizer spray pipes 113 to discharge the supplied stabilizer to the remediation target region.

The stabilizer supply pipe 112 can be rotatably formed. In this case, the stabilizer spray unit 110 can more effectively adjust a supply range of the stabilizer through rotation control. Specifically, in the embodiment, the stabilizer supply pipe 112 can be formed rotatably with a rotation shaft in an up-down direction. In this case, the stabilizer supply pipe 112 can include an upper part connected to the stabilizer storage 111 and a lower part rotatably joined to a lower side of the upper part by a bearing 112a as a medium. A transfer pump 112b can be disposed in the upper part of the stabilizer supply pipe 112 to assist the transfer of the stabilizer, as necessary.

Distribution vanes 112c can be provided inside the stabilizer supply pipe 112. The distribution vanes 112c divide an inner channel of the stabilizer supply pipe 112 into a plurality of channels so that the stabilizer can be uniformly distributed to the stabilizer spray pipes 113. The number, arrangement, and the like of the distribution vanes 112c can correspond to the number, arrangement, and the like of the stabilizer spray pipes 113. In addition, the distribution vanes 112c can be formed to uniformly distribute the stabilizer supplied from above through a structural shape, a slope, or the like to the respective stabilizer spray pipes 113.

Meanwhile, the stabilizer spray unit 110 can include the stabilizer spray pipe 113. The stabilizer spray pipe 113 can be disposed at the lower end of the stabilizer supply pipe 112 to discharge the stabilizer transferred through the stabilizer supply pipe 112 to the remediation target region. A plurality of stabilizer spray pipes 113 can be provided, and the plurality of stabilizer spray pipes 113 can be arranged radially about the stabilizer supply pipe 112 at the center. The plurality of radially arranged stabilizer spray pipes 113 can be rotated in conjunction with the rotation of the stabilizer supply pipe 112 to induce uniform spraying of the stabilizer in all directions.

The stabilizer spray pipe 113 can have a discharge chute 113a in an end region from which the stabilizer is discharged. The discharge chute 113a can generally extend to correspond to a longitudinal direction of the stabilizer spray pipe 113 and can have a shape having an open upper surface.

Hence, the stabilizer transferred along the stabilizer spray pipe 113 can be sprayed outward by a transfer speed and a centrifugal force in a region of the discharge chute 113a. The discharge chute 113a can have a rear end region to be formed in a shape inclined upward at a predetermined degree or to extend in a shape that is gently curved upward, as necessary. In this case, the stabilizer moved along the discharge chute 113a can be effectively sprayed over a larger region.

Meanwhile, the stabilizer spray pipe 113 can be formed such that an angle thereof can be adjusted. In other words, the stabilizer spray pipe 113 can be formed such that an arrangement angle thereof can be adjusted with respect to the stabilizer supply pipe 112. In this case, the adjustment of the arrangement angle of the stabilizer spray pipe 113 enables a spray range of the stabilizer to be adjusted or enables uniform spraying of the stabilizer to be induced. In addition, regarding the plurality of stabilizer spray pipes 113, a technique of spraying the stabilizer by making the stabilizer spray pipes 113 have different arrangement angles from each other, and the like can also be considered.

In the embodiment, the stabilizer spray pipes 113 can be connected to the stabilizer supply pipe 112 through a manifold 113b. The manifold 113b can distribute the stabilizer provided from the stabilizer supply pipe 112 to the individual stabilizer spray pipes 113. The manifold 113b can be formed to adjust the arrangement angles of the individual stabilizer spray pipes 113. For example, the manifold 113b can be partially or entirely made of a flexible material and be implemented to adjust the angles.

The stabilizer spray pipe 113 can be equipped with respective angle adjusters 113c. The angle adjusters 113c can be formed to support the individual stabilizer spray pipes 113 at predetermined arrangement angles, respectively. For example, the angle adjuster 113c includes a drive unit such as a cylinder, an actuator, or the like, and can be formed to support a portion between the stabilizer supply pipe 112 and the stabilizer spray pipes 113 by a link unit such as a hinge, a folding structure, or the like.

With reference to FIG. 1 again, the surface layer improvement system 100 according to the embodiment can include the disturbing and mixing unit 120.

The disturbing and mixing unit 120 can mix the sprayed stabilizer with a contaminated sediment layer. In addition, the disturbing and mixing unit 120 can disturb the contaminated sediment layer before the spraying of the stabilizer, as necessary. The disturbance of the contaminated sediment layer before the spraying of the stabilizer enables the stabilizer to be more effectively incorporated into the contaminated sediment layer.

The disturbing and mixing unit 120 can be disposed in the water similarly to the stabilizer spray unit 110 and can be disposed inside the barrier structure 130 in the case where the barrier structure 130 is installed.

The disturbing and mixing unit 120 can be implemented in a form integrated partially or entirely with the stabilizer spray unit 110, as necessary. In addition, the disturbing and mixing unit 120 can share some configurations such as a support structure with the stabilizer spray unit 110. Alternatively, the disturbing and mixing unit 120 can be configured as a single independent unit separate from the stabilizer spray unit 110. In this case, the stabilizer spray unit 110 and the disturbing and mixing unit 120 can be used in combination with each other, or only a part thereof can be selectively disposed and used depending on the working environment.

Figure 3:
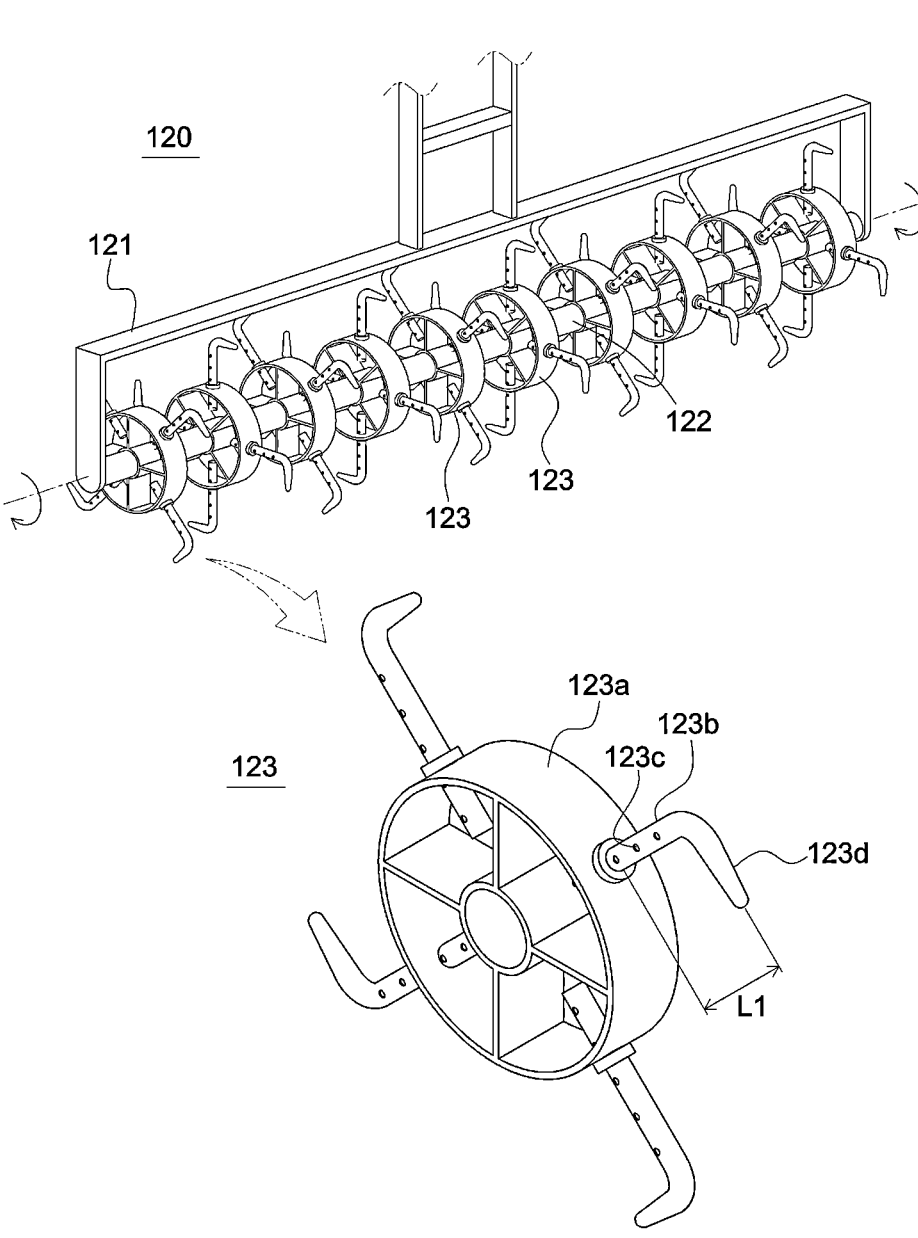
FIG. 3 is a view of details of a disturbing and mixing unit illustrated in FIG. 1.

FIG. 3 is a view of details of a disturbing and mixing unit illustrated in FIG. 1.

With reference to FIG. 3, the disturbing and mixing unit 120 can include a support body 121. The support body 121 can provide a support structure for disturbing and mixing wheels 123 to be described below. In the embodiment, the support body 121 can be mounted and supported on one side of the stabilizer spray unit 110. The support body 121 can have a detachable joining structure and can be mounted on the stabilizer spray unit 110, as necessary.

Meanwhile, the disturbing and mixing unit 120 can include a rotation shaft 122. The rotation shaft 122 can be mounted on the support body 121 to be rotatable about an axis in a longitudinal direction thereof. In addition, the rotation shaft 122 can be driven rotatably about the axis in the longitudinal direction thereof by a predetermined driving unit. The disturbing and mixing wheels 123 to be described below can be rotatably operated by the rotation of the rotation shaft 122.

Meanwhile, the disturbing and mixing unit 120 can include the disturbing and mixing wheels 123. The disturbing and mixing wheels 123 can be fastened to the rotation shaft 122 and can be rotatably driven together with the rotation shaft 122. In this manner, the disturbing and mixing wheels 123 can be rotatably driven in the remediation target region and can mix the stabilizer with the contaminated sediment layer or can disturb the contaminated sediment layer before the spraying of the stabilizer.

The disturbing and mixing wheel 123 can include a rim 123a that is fastened to the rotation shaft 122. The rim 123a can be fastened to the rotation shaft 122 by a joining unit such as a key and the like, and can be rotated together with the rotation shaft 122.

In addition, the disturbing and mixing wheel 123 can include a plurality of blades 123b arranged on the rim 123a. The plurality of blades 123b can perform a mixing or disturbing function depending on the rotation of the rim 123a. The blade 123b can be provided in plurality, and the plurality of blades 123b can be arranged apart at predetermined intervals in a rotation direction of the disturbing and mixing wheel 123. In other words, the plurality of blades 123b can be arranged apart in a circumferential direction of the rim 123a. In the embodiment, a case where four blades 123b are arranged apart at about 90-degree intervals is illustrated. However, the number, the intervals, or the like of the blades 123b can be increased or decreased appropriately as necessary.

The blade 123b can be formed to project from the rim 123a, and a length L1 projecting therefrom is adjustable. In this case, the blade 123b can have a length L which can be appropriately adjusted according to a pile thickness of the contaminated sediment layer. In the embodiment, the blade 123b can have a plurality of fixing holes 123c separated in a longitudinal direction of the blade 123b and can be fastened to the rim 123a by a joining member such as a pin and the like, which is selectively joined into the fixing hole 123c. A user can fix the blade 123b at a position corresponding to the predetermined fixing hole 123c, thereby appropriately adjusting the length L1 of the blade 123b according to an operation environment.

A bent end portion 123d can be formed at an end portion of the blade 123b spaced apart from the rim 123a. The bent end portion 123d can be formed with the end portion of the blade 123b being bent and extending or being curved to a certain degree in the circumferential direction. The bent end portion 123d reduces excessive physical interference with the water bottom floor 10 when the blade 123b rotates, and the bent end portion can prevent the blade 123b from being damaged.

Meanwhile, the disturbing and mixing wheel 123 can be provided in plurality, and the plurality of disturbing and mixing wheel 123 can be arranged apart at predetermined intervals in a longitudinal direction of the rotation shaft 122. In the embodiment, ten disturbing and mixing wheel 123 are illustrated. The number of disturbing and mixing wheel 123 can increase or decrease as necessary.

Figure 4A:
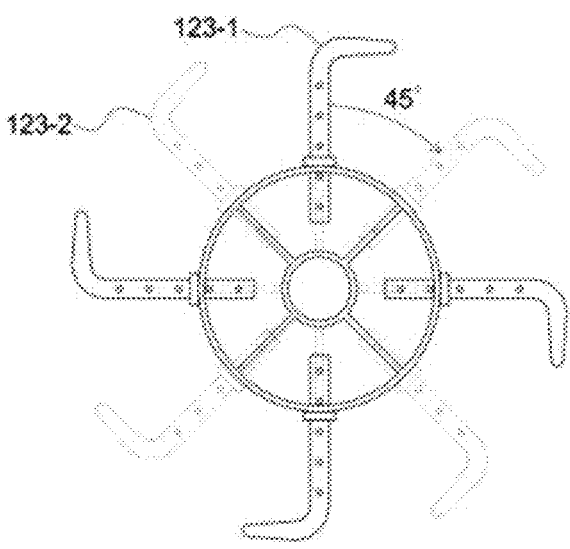
FIGS. 4A and 4B are an arrangement view of disturbing and mixing wheels illustrated in FIG. 3.
Figure 4B:
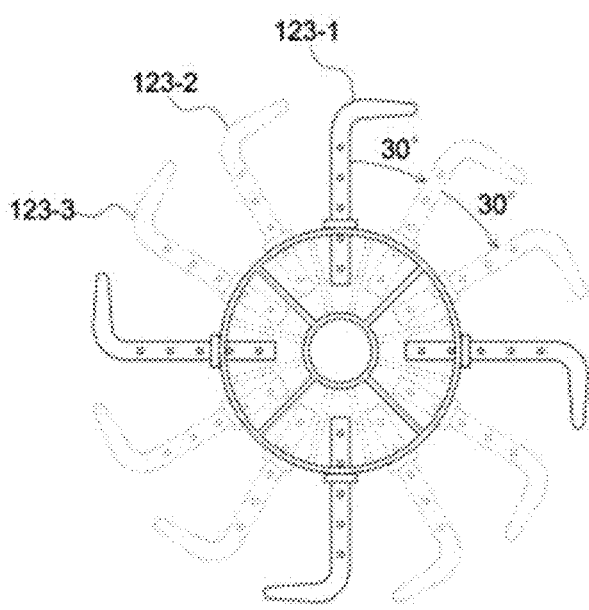

FIGS. 4A and 4B are an arrangement view of disturbing and mixing wheels illustrated in FIG. 3.

With reference to FIGS. 4A and 4B, one disturbing and mixing wheel 123 can be disposed at a position different from a position of another adjacent disturbing and mixing wheel 123 according to a rotation direction. In this case, according to the rotation of the rotation shaft 122, the disturbing and mixing wheels 123 can cause disturbance or mixing with predetermined time differences so that more efficient disturbance and mixing can be achieved.

For example, with reference to FIG. 4A, when a disturbing and mixing wheel (referred to as a first disturbing and mixing wheel 123-1) is disposed at a predetermined position and another disturbing and mixing wheel (referred to as a second disturbing and mixing wheel 123-2) is disposed adjacent to the first disturbing and mixing wheel 123-1, the second disturbing and mixing wheel 123-2 can be disposed at a misaligned angle of about 45 degrees in the rotation direction with respect to the first disturbing and mixing wheel 123-1. In addition, still another disturbing and mixing wheel adjacent to the second disturbing and mixing wheel 123-2 can be disposed at a misaligned angle of about 45 degrees with respect to the second disturbing and mixing wheel 123-2. In this case, the disturbing and mixing wheels can be arranged in a form in which the first and second disturbing and mixing wheels 123-1 and 123-2 are alternately and repeatedly arranged along the rotation shaft 122.

In another example, with reference to FIG. 4B, when the first disturbing and mixing wheel 123-1 and the adjacent second disturbing and mixing wheel 123-2 are present, the second disturbing and mixing wheel 123-2 can be positioned at a misaligned angle of about 30 degrees in the rotation direction with respect to the first disturbing and mixing wheel 123-1. In addition, still another third disturbing and mixing wheel 123-3 adjacent to the second disturbing and mixing wheel 123-2 can be disposed at a misaligned angle of about 30 degrees again with respect to the second disturbing and mixing wheel 123-2. In this case, the disturbing and mixing wheels can be arranged in a form in which the first to third disturbing and mixing wheels 123-1, 123-2, and 123-3 are alternately and repeatedly arranged along the rotation shaft 122.

With reference to FIG. 1 again, the surface layer improvement system 100 according to the embodiment can include the barrier structure 130.

The barrier structure 130 forms a predetermined internal space in the water and can be configured to accommodate the stabilizer spray unit 110, the disturbing and mixing unit 120, and the like. The barrier structure 130 can be used to limit stabilizer diffusion to other underwater regions due to spraying of the stabilizer and incorporation with contaminated sediments according to the stabilizer spray unit 110 and the like. The barrier structure 130 can induce isolation of the remediation target region and rapid reaction therein and enables the remediation treatment of a local region as necessary.

Figure 5:
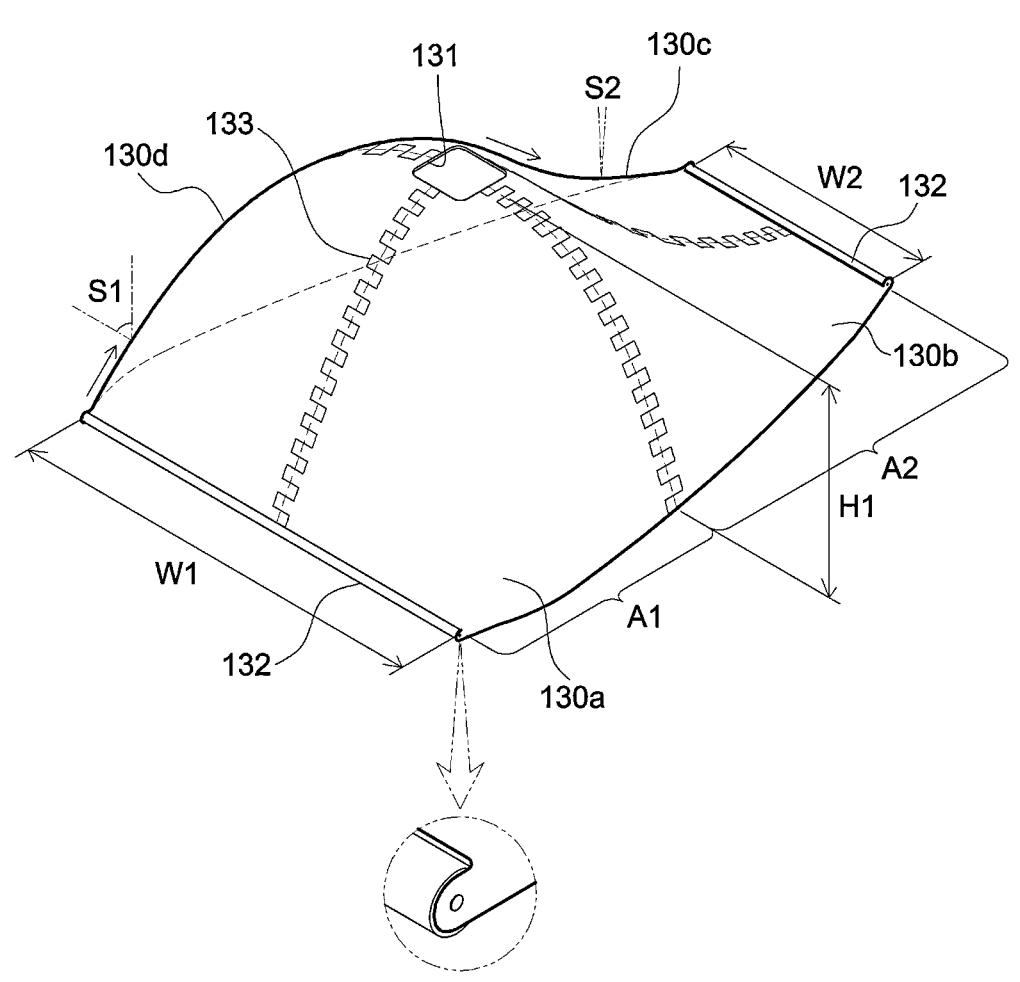
FIG. 5 is a view of details of a barrier structure illustrated in FIG. 1.

FIG. 5 is a view of details of a barrier structure illustrated in FIG. 1.

With reference to FIG. 5, the barrier structure 130 can be formed in a kind of case shape having an open bottom and a gently curved upper surface or side surface. The barrier structure 130 can be partially or entirely made of a material having predetermined stiffness to maintain a shape in the water and divide the internal space from other underwater regions (outside).

The barrier structure 130 can settle to be installed on the water bottom floor 10. The barrier structure 130 can be formed to settle on the water bottom floor 10 with self-weight, and settling installation of the barrier structure 130 can be assisted by the crane 30 as necessary. In some cases, the barrier structure 130 can be implemented to settle on the water bottom floor 10 with a predetermined additional weight in addition to the self-weight. For example, the barrier structure 130 can settle on the water bottom floor 10 with an additional weight of a ballast tank, a weight, or the like. In this case, reduction in the self-weight of the barrier structure 130 enables movement or installation difficulty to be further improved.

An outer surface of the barrier structure 130, which corresponds to the upper surface or side surface of the barrier structure 130, can form a gently curved shape. The barrier structure has the shape to minimize resistance in an underwater environment with a flow velocity. In the embodiment, the barrier structure 130 can have a maximum height H1 in a substantial central region in a front-rear direction and can be formed in a shape inclined gently upward from a front end toward the central region having the maximum height H1. In addition, the barrier structure 130 can be formed in a shape inclined gently downward from the central region having the maximum height H1 toward a rear end. More preferably, with a point having the maximum height H1 as the center, a front end region A1 of the barrier structure 130 can be formed to be inclined upward toward the central region at a relatively large inclination angle S1, and a rear end region A2 of the barrier structure 130 can be formed to be inclined downward to the rear end at a relatively small inclination angle S2. In addition, a width W1 at the front end of the barrier structure 130 in a right-left direction can be larger than a width W2 at the rear end by a predetermined degree. The shape of this barrier structure 130 can contribute to reducing resistance in an underwater environment.

An installation hole 131 can be provided at a central portion of the barrier structure 130. The installation hole 131 can be formed to penetrate the barrier structure 130 from the inside to the outside thereof. The installation hole 131 enables the cranes 30 or the like to access the inside of the barrier structure 130, or can be used as an installation structure for the stabilizer spray unit 110.

Guide rollers 132 can be added at the front and rear ends of the barrier structure 130. The guide rollers 132 can be joined to a lower front end portion and a lower rear end portion of the barrier structure 130 to be rotatable about a rotation shaft in the right-left direction and can have a function of assisting movement of the barrier structure 130. In some cases, the guide roller 132 can be replaced with an adjunct having a shape of a curtain or skirt made of a flexible material such as a geotextile or the like.

The barrier structure 130 can be divided into a plurality of pieces, as necessary. The division-type barrier structure 130 can be convenient for transportation or installation. In the embodiment, the barrier structure 130 can be divided into four blocks 130a to 130d including first to fourth blocks 130a to 130d. The first to fourth blocks 130a to 130d divide the barrier structure 130 into front, rear, right, and left pieces and can be assembled with each other to form a single barrier structure 130. However, the number, regions, or the like of divided pieces of the barrier structure 130 are not necessarily limited to the illustrated example and can be divided into more diverse shapes as necessary.

The first to fourth blocks 130a to 130d can have a predetermined joining structure and can be assembled with other adjacent blocks. In the embodiment, the first to fourth blocks 130a to 130d can have a joining line 133 with a plurality of repeated protrusions and groove and can be fitted and joined to other adjacent blocks. In this case, the first to fourth blocks 130a to 130d can be primarily assembled by the joining line 133, and then can be more completely assembled and fixed to each other by a predetermined additional joining unit.

With reference to FIG. 1 again, the surface layer improvement system 100 according to the embodiment can include a sensor unit 140.

The sensor unit 140 can be mounted on the barrier structure 130 or the like and can be configured to collect various environmental information during the remediation operation. Collected data can be provided to an external control terminal via a wired or wireless network, and operators or the like can monitor an operation situation in real time.

The sensor unit 140 can include a camera sensor 141. The camera sensor 141 can be disposed in a front region of the barrier structure 130 to correspond to a movement direction of the barrier structure 130. In addition, the sensor unit 140 can include a position sensor 142. The position sensor 142 can provide position information about the remediation target region in which a current operation is performed. In addition, the sensor unit 140 can include a turbidimeter 143. The turbidimeter 143 is disposed on the outer surface of the barrier structure 130 and can be configured to measure the turbidity outside the barrier structure 130. In this manner, an operator can evaluate whether the barrier structure 130 adequately blocks the remediation target region, an effect of the remediation operation on the external environment, and the like. The turbidimeter 143 can be disposed at a rear end region of the barrier structure 130. In addition, the sensor unit 140 can include a flow velocity sensor 144. The flow velocity sensor 144 can measure a flow velocity acting on the outer surface of the barrier structure 130.

The sensor unit 140 can additionally include various types of sensor units in addition to the sensor units illustrated above, as necessary. In addition, the arrangement of the sensor units illustrated above can vary in various ways depending on a measurement target, purpose, or the like, and is not necessarily limited to the above-illustrative examples. In addition, the sensor unit 140 can be implemented to be detachably attached to the barrier structure 130, and some sensor units can be selectively used as necessary.

Meanwhile, the stabilizer spray unit 110, the disturbing and mixing unit 120, the barrier structure 130, and the like described above can be partially or entirely made of a corrosion-resistant material as necessary. For example, the stabilizer spray unit 110, the disturbing and mixing unit 120, the barrier structure 130, and the like described above can be partially or entirely made of stainless steel.

Figure 6:
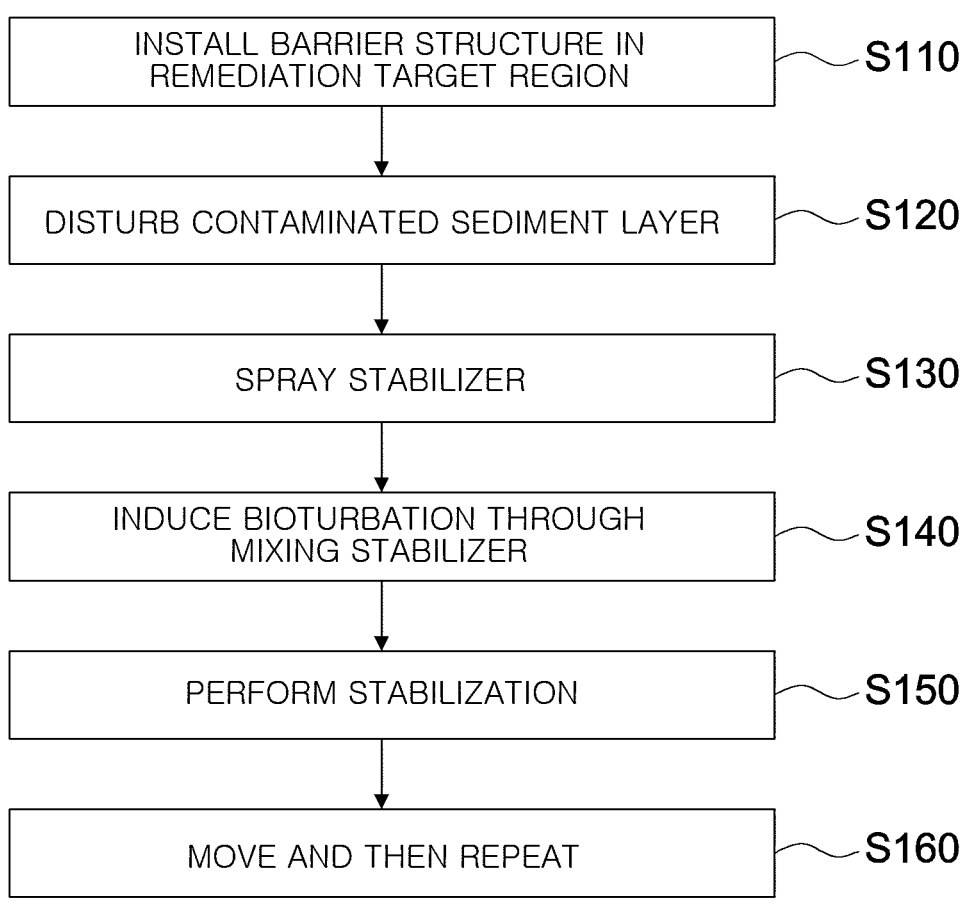
FIG. 6 is a flowchart illustrating an operation process of the surface layer improvement system illustrated in FIG. 1.

FIG. 6 is a flowchart illustrating an operation process of the surface layer improvement system illustrated in FIG. 1.

With reference to FIG. 6, optionally, the barrier structure 130 can be installed in the remediation target region (S110). In the embodiment, the barrier structure 130 can be assembled in the workboat 20 or the like after the blocks 130a to 130d are transported in a divided state to the remediation target region, and can settle and be installed in the remediation target region by the crane 30 or the like.

Afterwards, optionally, the disturbance of the contaminated sediments can be performed (S120). The disturbance of the contaminated sediments can be performed by the disturbing and mixing unit 120 inside the barrier structure 130. The disturbing and mixing unit 120 can rotate the plurality of disturbing and mixing wheels 123 on the contaminated sediment layer and can perform a disturbance operation.

Afterwards, the stabilizer can be sprayed to the remediation target region (S130). The stabilizer can be sprayed through the stabilizer spray unit 110, and the stabilizer spray unit 110 can uniformly spray the stabilizer to the remediation target region while rotating the plurality of stabilizer spray pipes 113 arranged radially. In order to more effectively spray the stabilizer, the stabilizer spray unit 110 can spray the stabilizer while changing an increase or a decrease of the rotation speed of the stabilizer spray pipe 113 or can spray the stabilizer while changing an arrangement angle of the stabilizer spray pipe 113.

Afterwards, the bioturbation can then be induced through the mixing with the stabilizer (S140). The mixing of the stabilizer can be achieved through the disturbing and mixing unit 120, and the disturbing and mixing unit 120 can mix the stabilizer with the contaminated sediments through a mechanism of operation similar to that of a disturbance step S120.

Afterwards, a stabilization process for a predetermined time can be performed (S150). Through the mixing step S140, the contaminated sediments mixed with the stabilizer undergoes the stabilization process and can be deposited back in the remediation target region. The stabilization step S150 can partially limit diffusion of turbidity inside the barrier structure 130 produced during the remediation treatment process to the other underwater regions.

Afterwards, a structure such as the barrier structure 130 and the like can be moved and installed in another adjacent remediation target region, and the aforementioned process can be repeated (S160). In some cases, the barrier structure 130 and the like can be moved on the water bottom floor 10 in a state of being supported by the crane 30.

As described above, the surface layer improvement system 100 according to the embodiments of the disclosure can perform the remediation of the contaminated sediments by a technique of spraying the stabilizer to the remediation target region of the water bottom floor 10 through the stabilizer spray unit 110 and performing the on-site incorporation of the stabilizer sprayed through the disturbing and mixing unit 120. This technique can be expected to have an immediate remediation effect compared to a natural recovery technique in the related art in that, in this technique, direct and active remediation treatment on the remediation target region is performed, and this technique is more cost-effective than the environmental dredging method in which contaminated sediments are physically removed through dredging.

In addition, the surface layer improvement system 100 according to the embodiments of the disclosure can perform the remediation treatment as described above in the isolated underwater space with a barrier structure 130. Hence, the remediation treatment can be carried out intensively and efficiently in a relatively small region, and an environmental effect of a process of the remediation treatment on other underwater regions can be minimized. In addition, this technique can function effectively in a relatively small-scale water system such as an inland river.

In addition, the surface layer improvement system 100 according to the embodiments of the disclosure can induce uniform spraying of the stabilizer and can effectively incorporate the sprayed stabilizer into the contaminated sediments with a unique configuration in which the stabilizer spray unit 110 that sprays the stabilizer while rotating and the disturbing and mixing unit 120 including the plurality of disturbing and mixing wheels 123 are provided. Hence, despite the above advantages, a remediation treatment operation can be carried out more easily and quickly, and the remediation effect can also be improved through uniform incorporation of the stabilizer.

As described above, the embodiments of the disclosure are described, but it is possible for a person of ordinary skills in the technical field to variously modify and change the disclosure by adding, modifying, removing, or supplementing a configurational element within a range without departing from the technical ideas of the disclosure described in claims, and these modifications and changes are also included within the scope of the rights of the disclosure.

The surface layer improvement system according to embodiments of the disclosure can perform the remediation of the contaminated sediments by a technique of spraying the stabilizer to the remediation target region of a water bottom floor through the stabilizer spray unit and performing on-site incorporation of the stabilizer sprayed through the disturbing and mixing unit. This technique can be expected to have an immediate remediation effect compared to a natural recovery technique in the related art in that, in this technique, direct and active remediation treatment on the remediation target region is performed, and this technique is more cost-effective than the environmental dredging method in which contaminated sediments are physically removed from water bottom floor through dredging.

In addition, the surface layer improvement system according to the embodiments of the disclosure can perform the remediation treatment as described above in an isolated underwater space with a barrier structure. Hence, the remediation treatment can be carried out intensively and efficiently in a relatively small region, and an environmental effect of a process of the remediation treatment on other underwater regions can be minimized. In addition, this technique can function effectively in a relatively small-scale water system such as an inland river.

In addition, the surface layer improvement system according to the embodiments of the disclosure can induce uniform spraying of the stabilizer and can effectively incorporate the sprayed stabilizer into the contaminated sediments with a unique configuration in which the stabilizer spray unit that sprays the stabilizer while rotating and the disturbing and mixing unit including the plurality of disturbing and mixing wheels are provided. Hence, despite the above advantages, a remediation treatment operation can be carried out more easily and quickly, and the remediation effect can also be improved through uniform incorporation of the stabilizer.

However, technical effects that can be achieved by the embodiments of the disclosure are not necessarily limited to the above-mentioned effects. Other unmentioned technical effects may be clearly understood by a person with ordinary skills in the technical field to which the disclosure pertains, from other descriptions in the specification, such as detailed description.

While the present disclosure has been described with respect to the specific embodiments, it will be apparent to those skilled in the art that various changes and modifications may be made without departing from the spirit and scope of the invention as defined in the following claims.

What is claimed is:

1. A surface layer improvement system for on-site remediation of contaminated sediments at a water bottom floor, the surface layer improvement system comprising:

a stabilizer spray unit that performs underwater spraying of a stabilizer to a remediation target region; and a disturbing and mixing unit that induces bioturbation by mixing the stabilizer with the contaminated sediments in water, wherein the stabilizer spray unit includes:

a stabilizer storage in which the stabilizer is stored, a stabilizer supply pipe in which the stabilizer is transferred and guided from the stabilizer storage, and stabilizer spray pipes which are connected to the stabilizer supply pipe and through which the stabilizer is sprayed to the remediation target region, wherein the stabilizer supply pipe has a distribution vane which partitions an inner channel of the stabilizer supply pipe into a plurality of channels, and wherein the stabilizer spray pipes are arranged radially about the stabilizer supply pipe and are formed to rotate about the stabilizer supply pipe, have respective angle adjusters which adjust an arrangement angle with respect to the stabilizer supply pipe, and enable a spraying range of the stabilizer to be adjusted by adjusting a rotation speed or an arrangement angle.

2. The surface layer improvement system according to claim 1, wherein the stabilizer spray unit and the disturbing and mixing unit are supported by a workboat and a crane on the water to be maintained at an underwater location, and the stabilizer includes a pellet or solid particle stabilizer.

3. The surface layer improvement system according to claim 1, wherein each of the stabilizer spray pipes has a discharge chute at an end region from which the stabilizer is discharged, the discharge chute being formed in a shape having an open upper surface.

4. The surface layer improvement system according to claim 1, wherein the disturbing and mixing unit includes a rotation shaft driven rotatably about an axis in a longitudinal direction, and a plurality of disturbing and mixing wheels which are provided about the rotation shaft and disturb and mix the stabilizer with the contaminated sediments.

5. The surface layer improvement system according to claim 4, wherein each of the disturbing and mixing wheels includes a rim that is fastened to the rotation shaft, and a plurality of blades arranged apart at predetermined intervals in a circumferential direction along the rim.

6. The surface layer improvement system according to claim 5, wherein each of the blades has a plurality of fixing holes formed in a longitudinal direction to enable a length to be adjusted depending on a pile thickness of the contaminated sediments, and a bent end portion formed at an end portion separated from the rim.

7. The surface layer improvement system according to claim 4, wherein each of the disturbing and mixing wheels is disposed at a position different from a position of another adjacent disturbing and mixing wheel according to a rotation direction.

8. The surface layer improvement system according to claim 1, wherein a barrier structure isolates the remediation target region from other underwater regions and accommodates the stabilizer spray unit and the disturbing and mixing unit inside during on-site remediation.

9. The surface layer improvement system according to claim 8, wherein the barrier structure is formed having an open bottom and a curved upper surface or side surface.

10. The surface layer improvement system according to claim 9, wherein the barrier structure is formed to settle and be installed on the water bottom floor with a self-weight or a predetermined additional weight.

11. The surface layer improvement system according to claim 9, wherein the barrier structure has a guide roller at a front end or a rear end to assist movement of the barrier structure or a curtain made of a flexible material including geotextiles.

12. The surface layer improvement system according to claim 9, wherein the barrier structure is formed to have a plurality of divided blocks and enables the plurality of blocks to be assembled and separated from each other with a joining line.

13. The surface layer improvement system according to claim 9, comprising a sensor unit that monitors an on-site remediation operation, wherein the sensor unit includes one or more of a camera sensor, a position sensor, a turbidimeter, and a flow velocity sensor.

* * * * *